United States Patent [19]

Kusik et al.

[11] Patent Number: 5,015,288

[45] Date of Patent: May 14, 1991

[54] GAS-FIRED ALUMINUM MELTER HAVING RECIRCULATING MOLTEN SALT BATH AND PROCESS

[75] Inventors: Charles L. Kusik, Lincoln; Edward Interess, Winchester, both of Mass.

[73] Assignee: Gas Research Institute, Chicago, Ill.

[21] Appl. No.: 443,716

[22] Filed: Nov. 29, 1989

[51] Int. Cl.$^5$ .............................. C22B 21/06; F27B 3/04
[52] U.S. Cl. ....................................... 75/686; 266/159; 266/205
[58] Field of Search .............. 75/65 R, 68 R; 266/159, 266/205

[56] References Cited

U.S. PATENT DOCUMENTS

| | | | |
|---|---|---|---|
| 3,846,123 | 11/1974 | Racunas et al. | 75/68 R |
| 3,869,112 | 3/1975 | Habayeb | 266/159 |
| 4,038,068 | 7/1977 | Tyler et al. | 75/76 |
| 4,511,398 | 4/1985 | Kugler | 75/63 |
| 4,568,430 | 2/1986 | Vire | 75/68 R |
| 4,576,690 | 3/1986 | Fields et al. | 204/67 |
| 4,758,316 | 7/1988 | Stewart et al. | 204/67 |
| 4,761,207 | 8/1988 | Stewart et al. | 204/67 |

*Primary Examiner*—Melvyn J. Andrews
*Attorney, Agent, or Firm*—Weingarten, Schurgin, Gagnebin & Hayes

[57] ABSTRACT

A method and apparatus are provided for combusting a gaseous fuel in molten salt to generate a heated recirculating salt bath for melting aluminum. Combustion products are prevented from directly contacting aluminum. Gaseous fuel is introduced into a chamber containing the molten salt bath through a lance beneath its surface. The combusting gas heats the salt bath and causes an upward flow. At the top of the chamber, combustion products separate from the molten salt, which then flows downward into a second chamber. In one embodiment of the invention, aluminum is introduced into the downward-flowing salt bath of the second chamber. Molten aluminum settles in the less-dense downward-flowing salt bath, which recirculates from the second chamber to the first chamber for reheating. A second embodiment utilizes an additional chamber in which the heated molten salt is flowed upward to enable counter-current contact of heated molten salt with aluminum. The aluminum melts and settles downward against the upward-flowing molten salt within the additional chamber, and the molten salt recirculates through a fourth chamber to the bottom of the first chamber for reheating.

45 Claims, 4 Drawing Sheets

GAS-FIRED ALUMINUM MELTER HAVING RECIRCULATING MOLTEN SALT BATH AND PROCESS

FIELD OF THE INVENTION

This invention relates to a method and apparatus for melting aluminum, and in particular for transferring the heat of combusting gaseous fuel to aluminum through contact with a continuous bath of molten salt.

BACKGROUND OF THE INVENTION

This invention relates to the field of melting aluminum. Current melting technology for aluminum is based largely on the reverberatory furnace which uses natural gas or other energy forms to heat aluminum. The generated heat is transferred to the aluminum by means of radiation and convection between gas and solid materials. However, this process is inefficient because it results in high gas consumption, large volume of combustion products or "off gases," and long processing times.

A bath of molten salt has been used to heat metals such as steel and its alloys. The use of a bath of molten salt as a medium for transferring heat from a heat source to the aluminum to be melted has an advantage over the reverbatory furnace in that the heat convection from the molten salt to the solid aluminum is more thermally efficient than the use of gas to transfer heat to the solid aluminum. Molten salts or fluxes have been proposed as mediums for refining or heating aluminum and alloys thereof in U.S. Pat. Nos. 4,038,068, 4,511,398, 4,568,430, 4,576,690, and 4,761,207. The processes described in these patents are generally associated with disadvantages, such as adjustments which are required of the salt bath composition, complexity of procedures used for separating aluminum from the molten salt, complexity of procedures for removing contaminants from molten salt, and the number of steps in which affirmative action or electrochemical intervention is required to maintain overall continuity of the process. Moreover, none of these processes particularly address the need for an inexpensive and efficient means for heating the salt bath by natural gas in connection with transferring the generated heat through an efficient and practical means to solid aluminum. A need therefore exists for a melter which combines thermal efficiency and compactness of design.

SUMMARY OF THE INVENTION

The present invention provides a method and apparatus for heating a bath of molten salt by combusting natural gas beneath its surface to generate a recirculating salt bath for melting aluminum. A primary purpose of the invention is to prevent oxidants and combustion products from directly contacting the aluminum. The aforementioned disadvantages of using molten salt are avoided, and the primary goal of the present invention is achieved, by the gas-fired melter described herein.

A molten salt bath is heated in a first container by combusting a gaseous fuel such as natural gas with gaseous oxidants such as air or oxygen introduced beneath the surface of the bath by a coaxial lance or nozzle. The advantage of this heating method is the thermal efficiency afforded by convection between the gaseous and liquid phase, as well as the convenience, inexpensiveness, and availability of gaseous fuels such as natural gas. The gas causes circulation of the molten salt to the top of the container, where combustion products such as carbon dioxide and water vapors are allowed to separate from the molten salt, thereby ridding the molten salt of oxidants which would otherwise contaminate the aluminum. The combustion products are allowed to separate from the first container through an exhaust vent or opening. The heated molten salt then flows out of the first container and downward into a second container, into which aluminum is introduced in the form of solid masses or ingots. The aluminum sinks, melting as it settles with the downward-flowing molten salt which subsequently separates therefrom and recirculates to the first container for reheating. The melting process in the second container affords efficient heat transfer from the liquid salt to the solid metal. Thus, the overall heat transfer mechanism utilized in the invention is a stepwise process involving heat transfers from combusting gases to the flowing molten salt bath and from the heated molten salt bath to the solid aluminum. Both steps of transferring heat are thermally efficient. Moreover, the use of at least two containers provides a circulatory flowing means of reheating molten salt once it has transferred heat energy to the aluminum ingots.

A variation of the invention employs a third chamber or "upcomer" in which aluminum is introduced downward into the upward-flowing flux, thereby facilitating counter-current contact between the aluminum and heated flux. The heated molten salt is flowed upwards out of the first container, into and through a second container or conduit, then into and upwards through a third container. Aluminum ingots are then introduced at the top of the additional upcomer and allowed to sink downward against the upcoming flux. This method yields a more efficient furnace because of the higher average temperature differences between the molten salt and aluminum, due to counter-current flow. Consequently, a lower overall operating temperature may be used. A fourth container or "downcomer" provides a conduit or channel through which the molten salt recirculates from the upcomer to the first container for reheating. The use of four containers has the advantage of enabling an efficient, compact melting system or furnace for a given throughput.

The present invention therefore affords thermal efficiency of operation as well as simplicity, compactness, and cost-efficiency of design.

DESCRIPTION OF THE DRAWINGS

The invention will be more fully understood from the following detailed description taken in conjunction with the accompanying drawings in which.

DETAILED DESCRIPTION OF THE PRESENT INVENTION

The invention provides a method and apparatus for combusting a gaseous fuel with a gaseous oxidant in a bath of molten salt to generate a continuous, recirculating heated salt bath for melting aluminum, which is introduced into the heated salt bath in solid pieces such as ingots after combustion products have separated from the salt bath. By using at least two chambers, one for the heating/combustion process, the other one for melting and separating aluminum from the molten salt, the invention prevents combustion products from directly contacting the aluminum introduced into the molten salt. A variety of molten salts can be employed, although chlorides such as sodium, potassium, or others may be advantageous since they are readily available, inexpensive, and used in the metallurgical industry.

Figure 1:
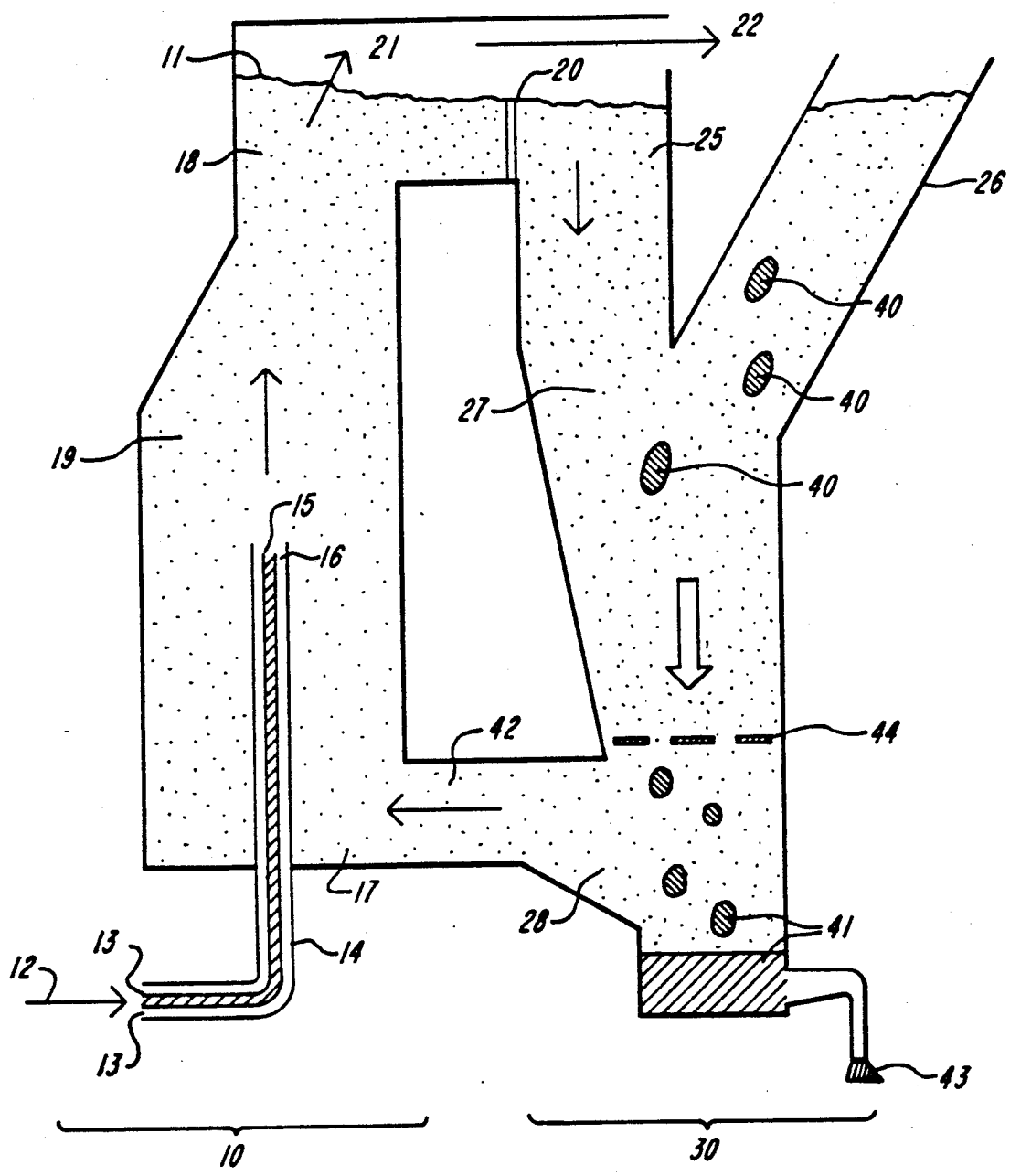
FIG. 1 is a diagrammatic view of one embodiment of the gas-fired aluminum melter in which aluminum is introduced into heated salt bath in a co-current downward-flowing direction.
Figure 1A:
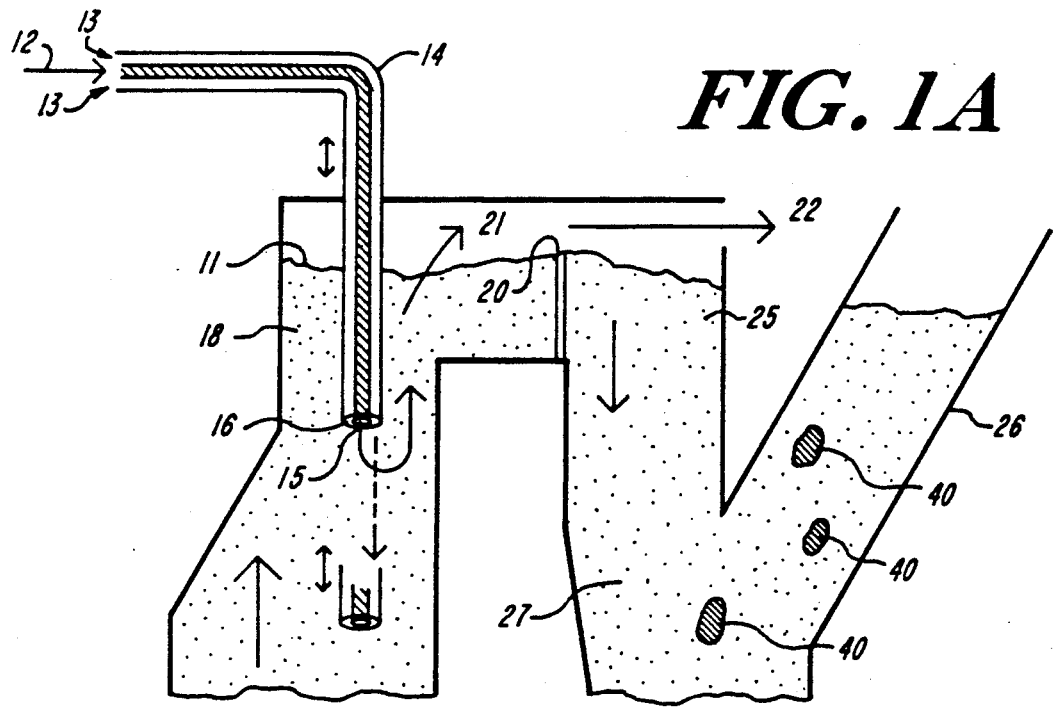
FIG. 1A is an alternative view of FIG. 1 in which a lance or nozzle introduces a combustible gas and oxidant into a first container in which the molten salt flows upward.

In one embodiment of the invention, aluminum melts and settles downward with the downward co-current flow of the heated salt bath. As shown in FIG. 1, a molten salt bath is heated in a first container 10 by combusting a gaseous fuel 12 such as natural gas with a gaseous oxidant 13 such as air or oxygen beneath the surface 11 of the molten salt bath. The gases 12/13 are introduced into the molten salt by a lance or nozzle 14 which is comprised of a center pipe 15 for flowing in the natural gas 12 and an outer concentric pipe 16 for flowing in air or oxygen 13. The lance or nozzle 14 may introduce gases upward into the salt bath as indicated in FIG. 1, or downward as indicated in FIG. 1A, or in any direction desired. The downward orientation of the lance or nozzle, it may be noted, allows for relatively easier removal of the lance or nozzle to prevent plugging by solidified salt material. FIG. 1 shows a tuyere used as a lance 14. The first container 10 includes a bottom opening 17, a top opening 18, and a chamber or conduit 19 continuous therebetween to permit the molten salt bath to be heated and flowed to the top of the first container 10 and out through the top opening 18. At the top opening 18, the products of combustion, typically carbon dioxide and water, separate from the heated salt bath 21 and are removed from the first container by an outlet opening or vent 22. The separated molten salt then flows downward into a receptacle opening 25 of a second container 30. A weir 20 or adjustable wall may be used to control the flow out of the first container. Aluminum ingots 40 are introduced into the salt bath flowing downward in the second container 30 by means of a charging port 26 shown to be obliquely disposed downward into the chamber 27 of the second container 30. Aluminum 40 introduced into the salt bath is allowed to melt and settle downward with the downward-flowing salt bath until it reaches a separation area 28 where the molten aluminum 41 separates from the less-dense molten salt. A grate 44 may be placed above the separation area 28 to suspend aluminum particles until they are melted down to a small enough size. The separated molten salt subsequently recirculates through a return channel 42 from the second container 30 to the bottom opening 17 of the first container 10 for reheating. Aluminum 40 may be recharged on a continuous basis in the second container 30, and in its molten form may be siphoned or tapped from the bottom 41 of the second container 30 through a taphole or exit pipe fitted with a clay plug 43.

Figure 2:
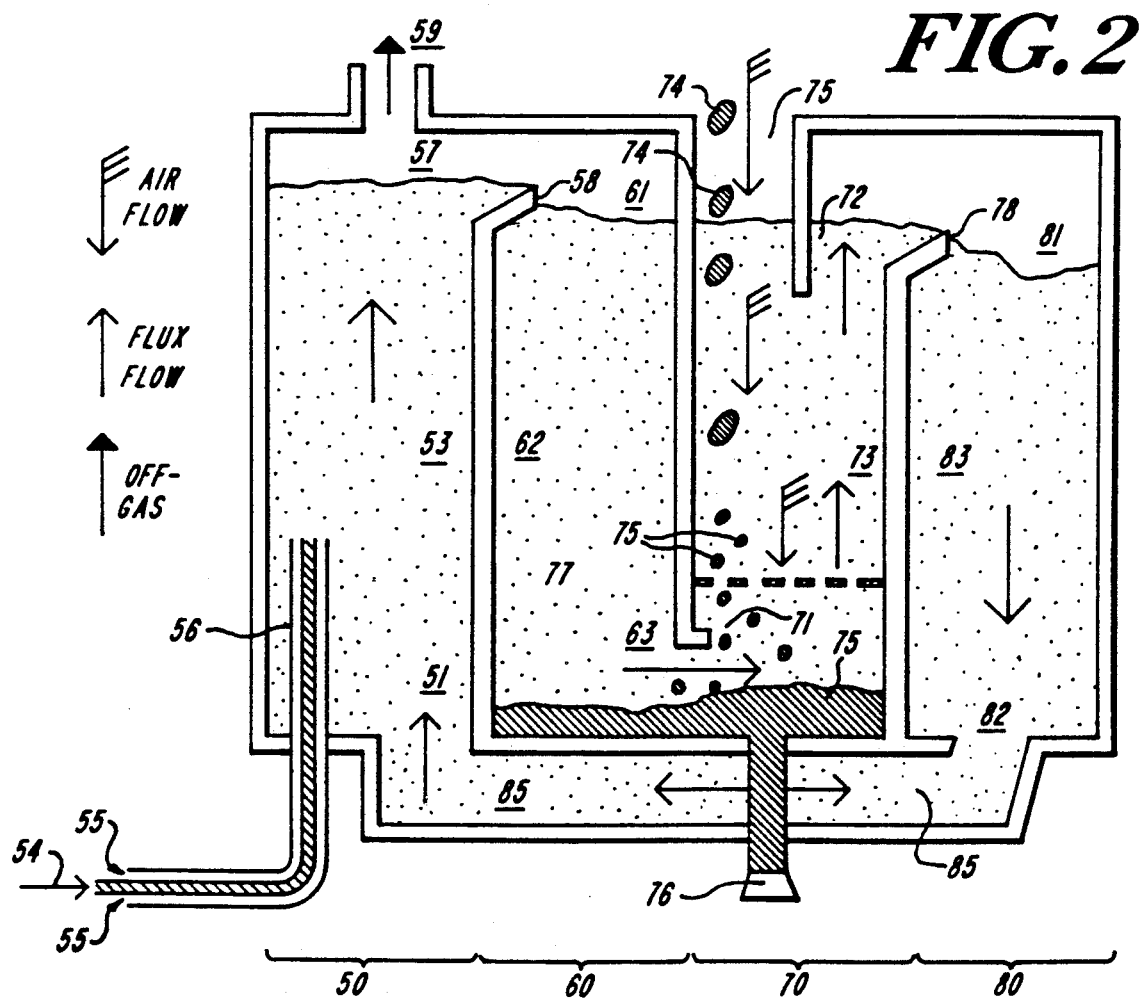
FIG. 2 is a diagrammatic view of a second embodiment of the melter with an additional two containers or conduits wherein the aluminum is introduced into a third container or "upcomer" and allowed to settle downward in a counter-current direction against upward-flowing molten salt, which then recirculates to the first container.
Figure 3:
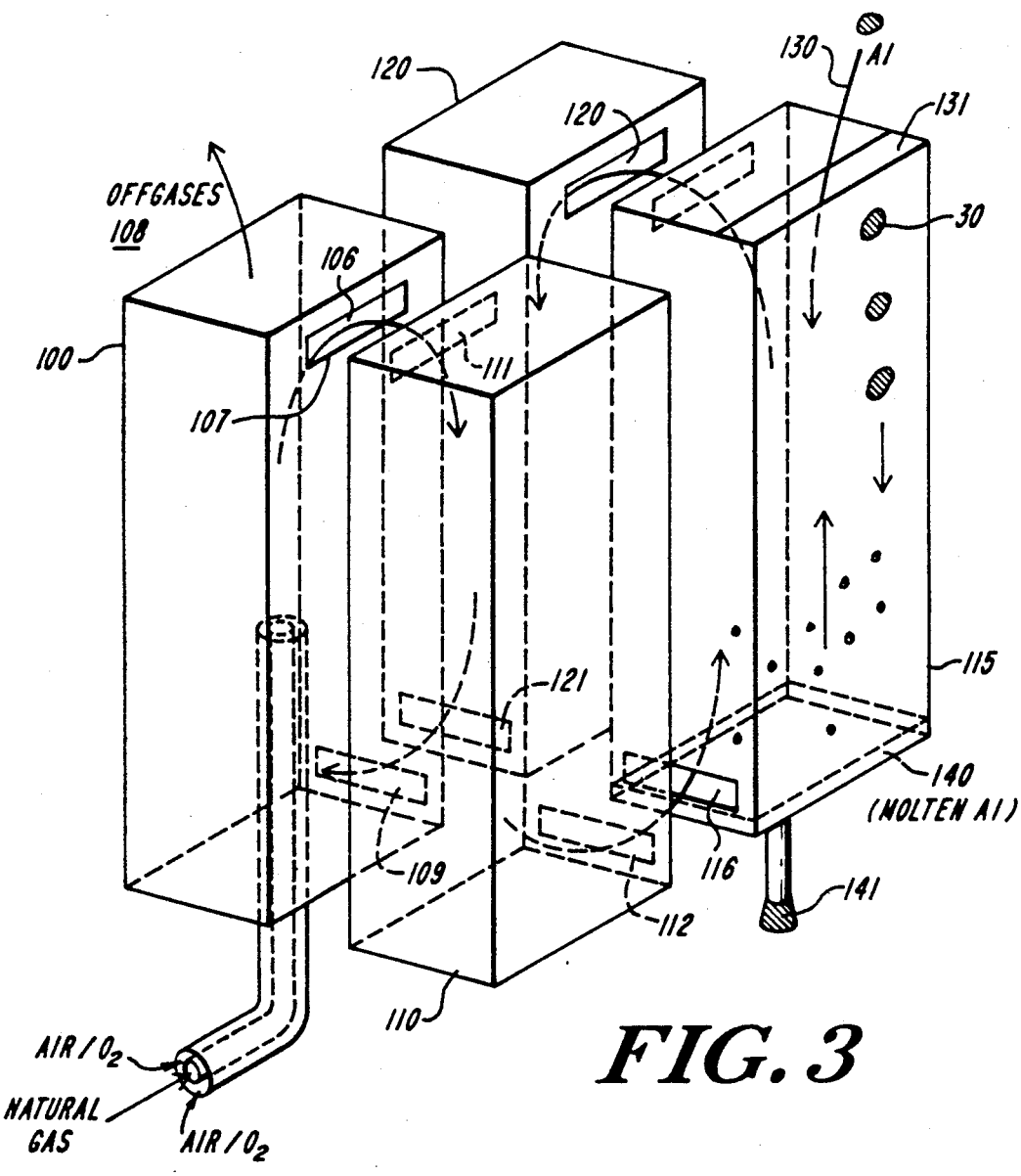
FIG. 3 is an exploded perspective view of the melter of FIG. 2 showing the four containers adjacently arranged.
Figure 3A:
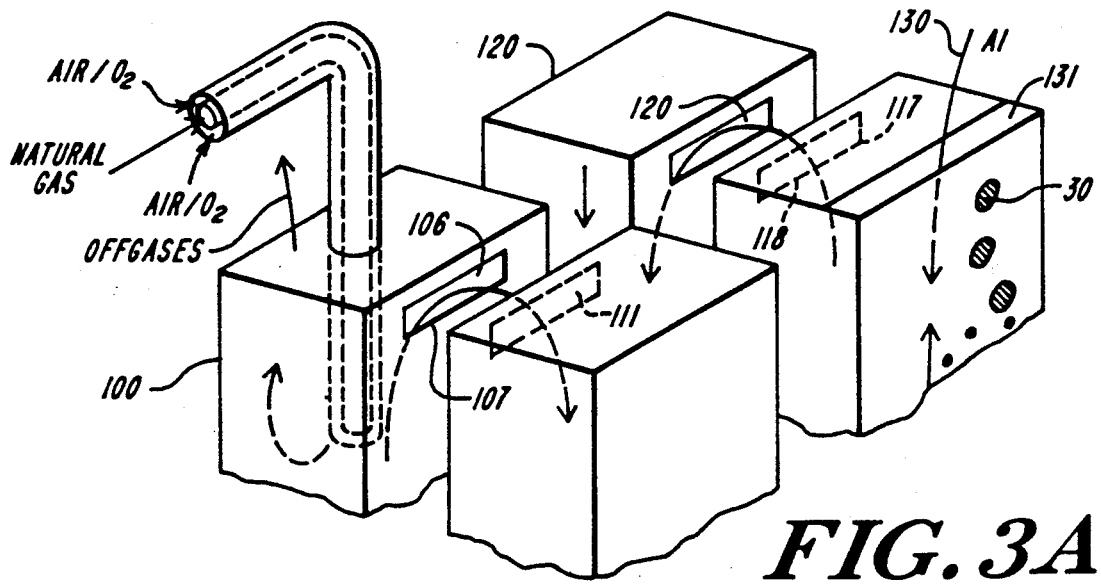
FIG. 3A is an alternative view of FIG. 3 in which a lance or nozzle introduces a combustible gas and oxidant into a first container in which the molten salt is flowed upward.

A second embodiment of the invention is shown in FIG. 2 wherein aluminum is placed into a third container or "upcomer" in which it is allowed to settle downward in counter-current manner against upward-flowing molten salt. A molten salt bath is heated in a first container 50 having a bottom opening 51, a top opening 52, and a chamber 53 continuous therebetween for upward passage of heated molten salt. The molten salt is heated by combusting natural gas 54 and air 55 which is introduced into the bath of molten salt by means of a lance or nozzle 56. The lance or nozzle 56 may introduce gases upward into the salt bath as indicated in FIG. 3, or downward as indicated in FIG. 3A, or in any direction desired. As shown in FIG. 2., the molten salt bath is heated thereby and caused to flow upwards through and out of the first container 50 through the top opening 52 where combustion products separate 57 as offgases from the flux and are removed from the first container 50 through an outlet opening or vent 59. After the combustion products have separated from the molten salt at the top of the first container, the molten salt is allowed to flow over a weir 58 and downward into a second container 60. The molten salt bath flows into a receptacle opening 61 in the second container 60 downward through a chamber 62 to a bottom opening 63, where it flows upwards into a third container or conduit 70. The third container or "upcomer" 70 has a bottom opening 71 for receiving the molten salt from the second container 60, a top opening 72, and a chamber 73 therebetween for the upward passage of the heated salt bath. Aluminum ingots 74 are introduced into the upward-flowing molten salt through a charging port 75 at the top of third container 70 and allowed to settle downward against the upward flow of the molten salt by means of its relatively greater density. The aluminum 74 settles downward through the chamber 73 and may be removed in its molten form 75 from the bottom of the third container 70 by siphoning or by removal through a taphole or exit pipe which is typically fitted with a clay plug 76. A grate 77 may be placed above the bottom of the third container 70 to suspend large aluminum pieces within the current of flowing molten salt until they melt. The molten salt flows upward through the chamber or conduit 73 in the third container 70, out of its top opening 72, over a weir 78, and downward into a fourth container 80, a "downcomer." A weir 78 may be positioned at the top of the third container 70 to control the flow of molten salt out of the third container 70. This weir should be located at a point lower than that of the weir 58 located at the top of the first container 10 to establish a gradient which facilitates overall continuous circulation of the molten salt through the four containers. The fourth container 80 has a receptacle opening 81, a bottom opening 82, and a chamber 83 continuous therebetween for passage of the downward-flowing molten salt. The molten salt flows out of the fourth container 80 through the bottom opening 82 and recirculates through a return channel 85 to the bottom opening 51 of the first container 10 for reheating.

The compactness and thermal efficiency of the counter-current melter is evident in the illustration of FIG. 3 which shows the four containers arranged side-to-side, each container adjacent with and forming a channel between two other containers. The four containers may also be conceived of simply as conduits, or four continuous sections of a folded pipe, though for purposes of explanation it is easier to describe them as four discrete containers or compartments. The molten salt bath flows from the first container 100 into the second container 110 and from the third container 115 into the fourth container 120 by means of openings (106/111) (117/120) located at the top of these respectively paired containers. Molten salt flows from the second container 110 into the third container 115 and from the fourth container 120 into the first container 100 by means of openings (112/116) (121/109) located at the bottom of these respectively paired containers. Each of the four containers, therefore, is adjacent to two other containers. Collectively, they provide a compact and thermally efficient system. Combustion products are removed through an exhaust vent or opening 108 at the top of the first container 100. Aluminum ingots 130 are introduced into the top of the third container 115 through a charging port 131 and allowed to settle downward against the upward-flowing molten salt therein. Aluminum may be recovered as molten aluminum 140 from the bottom of the third container 115 by siphoning it or, as illustrated, by tapping it off through a taphole or exit pipe which is typically fitted with a clay plug 141.

Figure 4:
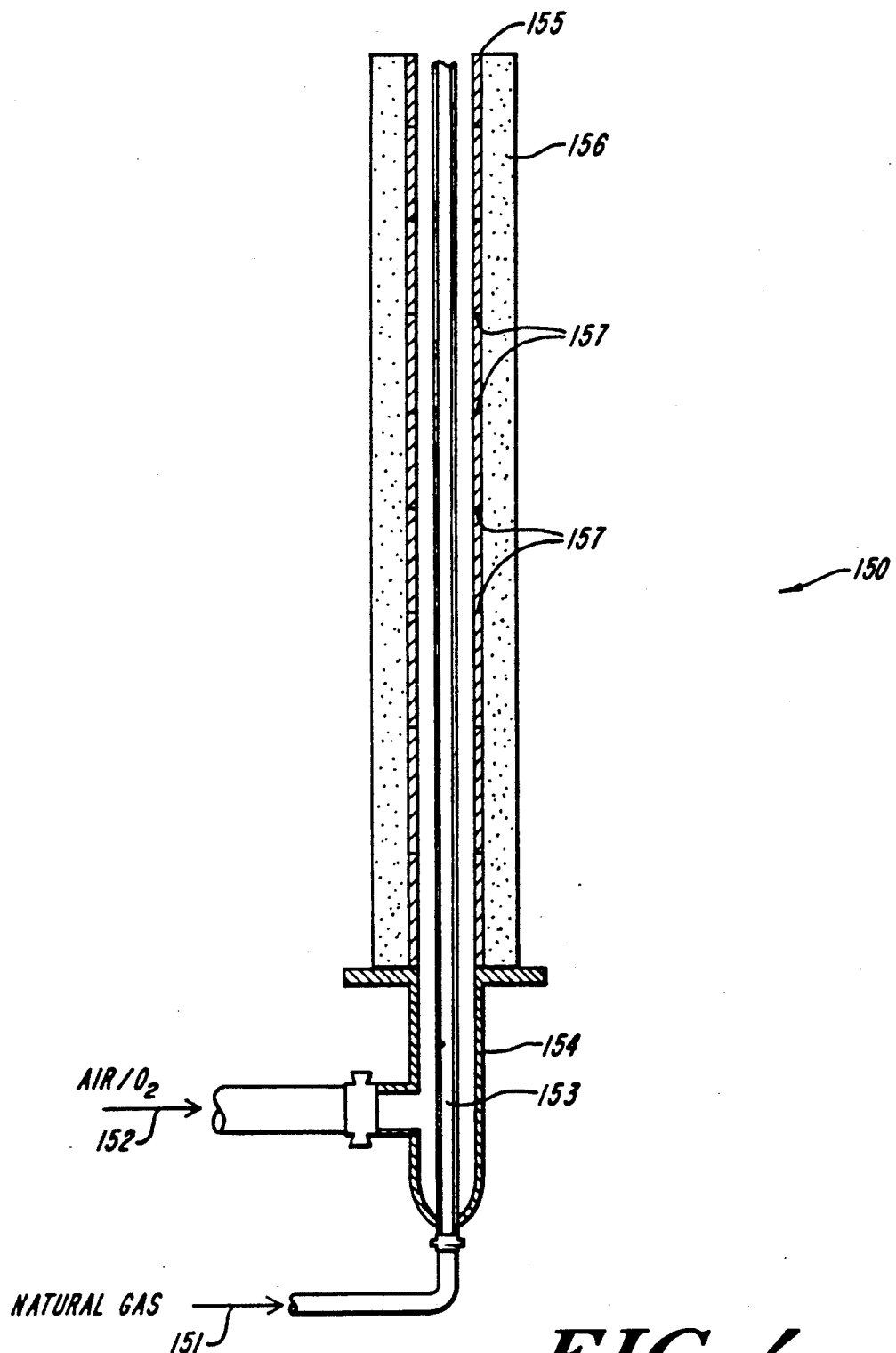
FIG. 4 is a side-elevation view of the lance or nozzle for combusting gaseous fuel with a gaseous oxidant under the surface of the molten salt bath.

As shown in FIG. 4., the lance or nozzle 150 used for introducing natural gas 151 and air or oxygen 152 into the molten bath of salt in the first container is comprised of a center pipe 153 for flowing the natural gas 151 and a concentric outer pipe 154 for flowing the air or oxygen 152. The inner center pipe 153, as well as the outer pipe 154, may be formed of stainless steel or other metals. The part of the nozzle which is brought into contact with the molten salt bath may further have fibrous silica insulation 155 outside of the outer concentric pipe 154. A castable alumina refractory 156 or heat-resisting ceramic material may further be used as a layer surrounding the fibrous silica insulation 155 to ensure that the heat and chemistry of the surrounding molten salt bath does not degrade the integrity of the tubing 153/154. The castable alumina refractory 156 and fibrous silica insulation 155 may be secured to the outer stainless steel tubing 154 by stainless steel pins 157, typically one-eighth inch in diameter, welded to the outer stainless steel tubing 154. The lance or nozzle 150 may be submerged into the salt bath to a depth in accordance with a desired rate of flow.

The invention has not been limited by what has been particularly shown and described, except as indicated by the following appended claims.

We claim:

1. A process for melting aluminum in a recirculating molten salt bath, comprising the steps of:
    heating a molten salt bath in a first container to a temperature at least sufficient for melting aluminum and causing the salt bath to flow upwards and out of said first container by combusting a gaseous fuel with a gaseous oxidant beneath the surface of the salt bath;
    separating combustion products from said first container;
    flowing the molten salt out of the top of said first container and thereafter downward into a second container;
    introducing aluminum into the heated salt bath in said second container and allowing the aluminum to settle downward therein and melt;
    separating molten aluminum from the downward-flowing molten salt; and
    allowing the separated salt bath to recirculate from said second container to said first container for reheating.

2. The process of claim 1 wherein said heating step further includes submerging beneath the surface of the molten salt bath in said first container at least one nozzle for introducing and combusting therein said gaseous fuel and said gaseous oxidant and flowing the molten bath upwards and out of said first container.

3. The process of claim 2 wherein said heating step further includes combusting said gaseous fuel through a center pipe of said at least one submerged nozzle and simultaneously flowing said gaseous oxidant through an outer concentric pipe of said at least one submerged nozzle.

4. The process of claim 3 wherein the rate of combustion and upward flow is controlled by submerging said at least one nozzle to an extent predetermined in accordance with a desired flow rate of the molten salt bath.

5. The process of claim 3 wherein the outer concentric pipe of said at least one submerged nozzle is covered by another layer of fibrous silica insulation which is further covered by a layer of castable alumina refractory.

6. The process of claim 1 wherein said gaseous fuel is natural gas and said gaseous oxidant is air.

7. The process of claim 1 wherein said gaseous fuel is natural gas and said gaseous oxidant is oxygen.

8. The process of claim 1 wherein the step of removing separated combustion products from said first container and the step of flowing the molten salt out of the top of said first container and downward into said second container comprise:
    removing said separated combustion products from said first container by means of an exhaust opening; and
    flowing the molten salt over a weir located at said top of said first container and into said second container after combustion products have separated from the molten salt.

9. The process of claim 1 wherein the step of introducing aluminum includes introducing aluminum ingots into the molten salt in said second container.

10. The process of claim 1 wherein the step of introducing aluminum includes introducing aluminum ingots into said second container by means of a charging port.

11. The process of claim 1 wherein the step of separating molten aluminum from the downward-flowing molten salt includes separating by density differences.

12. An apparatus for melting aluminum in a recirculating molten salt bath, comprising:
    a first container having a bottom opening, top opening, and a chamber therebetween for flowing a molten salt bath upward through said container;
    means for heating the salt bath in said first container to a temperature sufficient for melting aluminum and flowing the salt bath upwards from said bottom opening towards and out of said top opening by combusting within said first container a gaseous fuel with a gaseous oxidant;

means for separating combustion products from said first container;

a second container having a receptacle opening for receiving the separated molten salt from said first container, a column continuous with and located below said receptacle opening for flowing the salt bath downward therefrom, a means for introducing aluminum into the salt bath flowing downward within said column whereby the aluminum sinking downward is melted by the molten salt;

means for separating the molten aluminum from the salt bath; and means for allowing the separated molten salt to recirculate from said second container to said first container for reheating.

13. The apparatus of claim 12 wherein the means for heating the salt bath in said first container includes at least one nozzle submerged beneath the surface of the molten salt for introducing and combusting within the molten salt said gaseous fuel and said gaseous oxidant and causing the molten salt to flow upwards and out of said first container.

14. The apparatus of claim 13 wherein the at least one submerged nozzle includes a center pipe for introducing said gaseous fuel into the bath of molten salt and a concentric outer pipe for introducing said gaseous oxidant into the molten salt, whereby the combustion heats the molten salt bath and causes it to flow upwards and out of said first container.

15. The apparatus of claim 14 wherein the outer concentric pipe of said at least one submerged nozzle is covered by an outer layer of fibrous silica insulation which is further covered by an outer layer of castable alumina refractory.

16. The apparatus of claim 13 wherein the at least one nozzle is submergible to an extent predetermined in accordance with a desired flow rate of the molten salt bath.

17. The apparatus of claim 12 wherein said gaseous fuel is natural gas and said gaseous oxidant is air.

18. The apparatus of claim 12 wherein said gaseous fuel is natural gas and said gaseous oxidant is oxygen.

19. The apparatus of claim 12 wherein the means for separating combustion products from the bath of molten salt includes a weir located at the top opening of said first container and prepositioned over said second container for flowing the molten salt out of said first container and into said second container after combustion products have separated from the molten salt.

20. The apparatus of claim 12 wherein the means for introducing aluminum into said second container includes a charging port.

21. The apparatus of claim 12 wherein the means for introducing aluminum into said second container includes introducing aluminum ingots into the downward-flowing molten salt.

22. The apparatus of claim 12 wherein the means for separating sunken molten aluminum from the salt bath includes a separation zone located within said second container beneath the means for introducing aluminum into the column, said separation zone providing for molten salt to be separated from the aluminum after the aluminum has settled downward within and has been melted by the heated salt bath.

23. The apparatus of claim 12 wherein the means for removing the salt bath separated from the settled molten aluminum includes a settling zone located at the bottom of said second column for allowing aluminum to settle and be tapped or siphoned out of said first container.

24. The apparatus of claim 12 wherein the means for recirculating the bath of molten salt from said second container to said first container, comprises:

a separation zone located below said means for introducing aluminum into said second container; and means for connecting said separation zone of said second container to said bottom opening of said first container for allowing the molten salt bath to flow therebetween.

25. A process for melting aluminum in a recirculating molten salt bath, comprising the steps of:

heating a molten salt bath in a first container to a temperature at least sufficient for melting aluminum and allowing the salt bath to flow upwards and out of said first container by combusting a gaseous fuel with a gaseous oxidant beneath the surface of the salt bath;

separating combustion products from said first container;

flowing the heated salt bath out of the top of said first container and downward into a second container;

flowing the heated salt bath downward out of said second container and upwards into a third container;

introducing aluminum at the top of said third container into the heated salt bath flowing upwards therein and allowing the aluminum to melt therein and settle downward to the bottom of said third container against the upward-flowing molten salt;

flowing the salt bath upward and out of said third container and downward and into a fourth container;

flowing the salt bath downward through and out of said fourth container and upwards and into said first container for recirculation by reheating; and removing the molten aluminum from the salt bath at the bottom of said third container.

26. The process of claim 25 wherein said heating step further includes submerging beneath the surface of the molten salt bath in said first container at least one nozzle for introducing and combusting therein said gaseous fuel and said gaseous oxidant and flowing the molten salt bath upwards and out of said first container.

27. The process of claim 25 wherein said heating step further includes combusting said gaseous fuel through a center pipe of said at least one submerged nozzle and simultaneously flowing said gaseous oxidant through an outer concentric pipe of said at least one submerged nozzle.

28. The process of claim 27 wherein the outer concentric pipe of said at least one submerged nozzle is covered by an outer layer of fibrous silica insulation which is further covered by an outer layer of castable aluminum refractory.

29. The process of claim 26 wherein the rate of combustion and upward flow of the molten salt is controlled by submerging said at least one nozzle to an extent predetermined in accordance with a desired flow rate of the molten salt.

30. The process of claim 25 wherein said gaseous fuel is natural gas and said gaseous oxidant is air.

31. The process of claim 25 wherein said gaseous fuel is natural gas and said gaseous oxidant is oxygen.

32. The process of claim 25 wherein the step of removing separated combustion products and the step of flowing the heated salt bath out of the top of said first container and downward into said second container comprise:

removing separated combustion products from said first container by means of an exhaust opening; and flowing the separated molten salt over a weir located at said top of said first container and into said second container after combustion products have separated from the molten salt.

33. The process of claim 25 wherein the step of introducing aluminum includes introducing aluminum ingots into said molten salt at the top of said third container.

34. The process of claim 25 wherein the step of introducing aluminum includes introducing aluminum into said third container through a charging port located at the top of said third container.

35. The process of claim 25 wherein the step of separating molten aluminum from the downward-flowing molten salt includes separation by density differences.

36. An apparatus for melting aluminum in a recirculating molten salt bath, comprising:

a first container having a bottom opening, top opening, and a chamber therebetween for flowing a molten salt bath upward through said first container;

means for heating the salt bath in said first container to a temperature sufficient for melting aluminum and flowing the salt bath upwards from said bottom opening towards and out of said top opening by combusting within said first container a gaseous fuel with a gaseous oxidant;

means for removing combustion products at said top opening of said first container;

a second container having a receptacle opening for receiving the molten salt from said first container, a bottom opening for allowing molten salt to flow out of said second container, and a chamber therebetween for the downward passage of heated molten salt;

a third container having a bottom receptacle opening for receiving molten salt from said second receptacle, a top opening for allowing molten salt to flow out from said third container, a chamber therebetween for the upward passage of molten salt, and a means located at said top opening for introducing aluminum into said third container;

a fourth container having a top receptacle opening for receiving molten salt from said top opening of said third container, a bottom opening in communication with said bottom opening of said first container for flowing molten salt therebetween, and a chamber between said openings in said fourth container for passage of molten salt from said third container to said first container for reheating; and means for removing molten aluminum from the bottom of said third container.

37. The apparatus of claim 36 wherein the means for heating the salt bath in said first container includes at least one nozzle submerged beneath the surface of the molten salt for introducing and combusting within the molten salt said gaseous fuel and said gaseous oxidant and flowing the molten salt upwards and out of said first container.

38. The apparatus of claim 37 wherein the at least one submerged nozzle includes a center pipe for introducing said gaseous fuel into the molten salt and a concentric outer pipe for introducing said gaseous oxidant into the molten salt, whereby the combustion heats the molten salt and flows it upwards and out of said first container.

39. The apparatus of claim 38 wherein the outer concentric pipe of said at least one submerged nozzle is covered by an outer layer of fibrous silica insulation which is further covered by an outer layer of castable aluminum refractory.

40. The apparatus of claim 37 wherein the at least one nozzle is submergible to an extent predetermined in accordance with a desired flow rate of the molten salt.

41. The apparatus of claim 36 wherein said gaseous fuel is natural gas and said gaseous oxidant is air.

42. The apparatus of claim 36 wherein said gaseous fuel is natural gas and said gaseous oxidant is oxygen.

43. The apparatus of claim 36 wherein the means for separating combustion products from the salt bath includes a weir located at the top opening of said first container and prepositioned over said second container for flowing heated molten salt out of said first container and into said second container after combustion products have separated from the molten salt.

44. The apparatus of claim 36 wherein the means for introducing aluminum into said third container includes a charging port at the top of said third container for receiving aluminum.

45. The apparatus of claim 36 wherein the means for introducing aluminum into said third container includes introducing aluminum ingots into the downward-flowing molten salt in said third container.

* * * * *